United States Patent
Lin

(10) Patent No.: US 11,307,488 B2
(45) Date of Patent: Apr. 19, 2022

(54) LIGHT SOURCE SYSTEM

(71) Applicant: DELTA ELECTRONICS, INC., Taoyuan (TW)

(72) Inventor: Hung-Ying Lin, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 0 days.

(21) Appl. No.: 16/910,002

(22) Filed: Jun. 23, 2020

(65) Prior Publication Data

US 2021/0286244 A1   Sep. 16, 2021

(30) Foreign Application Priority Data

Mar. 10, 2020   (CN) .......................... 202010160323.2

(51) Int. Cl.
G03B 21/20 (2006.01)
G02B 26/00 (2006.01)

(52) U.S. Cl.
CPC ......... *G03B 21/204* (2013.01); *G02B 26/008* (2013.01)

(58) Field of Classification Search
CPC ........................... G03B 21/204; G02B 26/008
USPC ............................................................ 362/84
See application file for complete search history.

(56) References Cited

U.S. PATENT DOCUMENTS

| 9,279,987 | B2 | 3/2016 | Finsterbusch et al. |
| 2010/0060822 | A1 | 3/2010 | Sun |
| 2011/0199580 | A1* | 8/2011 | Hirata ................. G03B 21/208 353/31 |
| 2018/0172978 | A1* | 6/2018 | Hu ...................... G03B 21/204 |
| 2018/0314141 | A1* | 11/2018 | Yamakage ........... G03B 21/208 |

FOREIGN PATENT DOCUMENTS

| CN | 104252094 A | 12/2014 |
| CN | 210038428 U | 2/2020 |
| KR | 20180071085 A | 6/2018 |
| TW | 201245844 A1 | 11/2012 |
| TW | 201405048 A | 2/2014 |

* cited by examiner

*Primary Examiner* — Andrew J Coughlin
*Assistant Examiner* — Jessica M Apenteng
(74) *Attorney, Agent, or Firm* — CKC & Partners Co., LLC

(57) ABSTRACT

A light source system includes a fluorescent wheel, a color wheel, at least one light reflector, and a light source module. The fluorescent wheel includes at least one fluorescent section. The color wheel includes a filter portion. The light reflector has a reflective curved surface having a first focal point and a second focal point conjugated to each other. The first focal point is located on a rotation path of the fluorescent section. The second focal point is located on a rotation path of the filter portion. The light source module is configured to emit light to the first focal point.

13 Claims, 6 Drawing Sheets

LIGHT SOURCE SYSTEM

CROSS-REFERENCE TO RELATED APPLICATION

This application claims priority to China Application Serial Number 202010160323.2, filed Mar. 10, 2020, which is herein incorporated by reference.

BACKGROUND

Technical Field

The present disclosure relates to a light source system, and more particularly, to a light source system of a projection module.

Description of Related Art

A fluorescent wheel is a wavelength conversion element. As a key optical element in a projector, it converts light from a light source into fluorescent light. After the wavelength conversion material on the fluorescent wheel absorbs light of a specific wavelength, the internal electrons will transition from the ground state to the excited state, and then energy will be released by means of radiation such as photons and phonons. Photon conversion refers to the emission of photons of other wavelengths as the colored light of the projector when the excited electrons are discharged to the ground state. Phonon conversion refers to the excited electrons are directly released in the energy band through thermal energy, which causes the temperature of the fluorescent wheel to rise.

However, some problems would be caused in conventional projector: (1) it is necessary to use a collimating lens and a dichroic mirror to divide different colored lights (for example, three primary colors), however, complicating optical path often makes the optical system bulky, and the number of optical components to be used also leads to higher costs; (2) the collimating lens used in the optical path will be transmitted through by different colored lights in plurality directions, so that overheated and broken may be caused; and (3) the fluorescent wheel is sandwiched between two lenses for receiving light, so it may be difficult to dissipate heat because of the narrow space between the lenses.

Accordingly, how to provide a light source system to solve the aforementioned problems becomes an important issue to be solved by those in the industry.

SUMMARY

An aspect of the disclosure is to provide a light source system which can effectively solve the aforementioned problems.

According to an embodiment of the disclosure, a light source system includes a fluorescent wheel, a color wheel, at least one light reflector, and a light source module. The fluorescent wheel includes at least one fluorescent section. The color wheel includes a filter portion. The at least one light reflector has a reflective curved surface which has a first focal point and a second focal point conjugated to each other. The first focal point is located on a rotation path of the at least one fluorescent section. The second focal point is located on a rotation path of the filter portion. The light source module is configured to emit light to the first focal point.

In an embodiment of the disclosure, the reflective curved surface is a concave surface.

In an embodiment of the disclosure, a contour of the reflective curved surface partially matches a contour of an ellipsoid.

In an embodiment of the disclosure, the color wheel has a light-facing surface. The light-facing surface has a normal line extending through the second focal point and the reflective curved surface.

In an embodiment of the disclosure, the fluorescent wheel further includes a substrate. The at least one fluorescent section is disposed on the substrate.

In an embodiment of the disclosure, the at least one light reflector is located at a side of the substrate.

In an embodiment of the disclosure, the at least one light reflector extends to opposite sides of the substrate.

In an embodiment of the disclosure, the at least one light reflector has a slit. The fluorescent wheel partially passes through the slit.

In an embodiment of the disclosure, the color wheel has a light-facing surface. The light-facing surface has a normal line extending through the first focal point and the second focal point.

In an embodiment of the disclosure, a number of the at least one light reflector is two. The two light reflectors are respectively located at opposite sides of the substrate. The second focal points of the two light reflectors coincide.

In an embodiment of the disclosure, the substrate is a reflective substrate.

In an embodiment of the disclosure, the substrate is a transmissive substrate.

In an embodiment of the disclosure, the fluorescent wheel further includes a reflective section disposed on the substrate. The at least one fluorescent section and the reflective section are arranged in a ring shape.

Accordingly, in the light source system of the present disclosure, various colored lights (including the light emitted by the light source module and the light converted by the fluorescent wheel) are reflected by the reflective curved surface of the light reflector to the color wheel. In other words, the various colored lights reach the color wheel via the same light path. Therefore, the light path of the light source system of the present disclosure is relatively simple, and the cost can be reduced without using a collimating lens and a dichroic mirror. Furthermore, the fluorescent wheel of the present disclosure does not need to be sandwiched between two lenses, so the heat can be easily dissipated. In addition, the reflective curved surface of the light reflector of the present disclosure has a first focal point and a second focal point respectively located on the fluorescent wheel and the color wheel, and the reflective curved surface is configured to reflect light from one of the first focal point and the second focal point to the other of the first focal point and the second focal point. Therefore, even if a part of the light focused by the light source module on the first focal point is not converted by the fluorescent wheel, this part of the light will be reflected by the reflective curved surface to the color wheel, and then be reflected back to the fluorescent wheel sequentially by the color wheel and the reflective curved surface. As a result, the light usage can be effectively improved.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
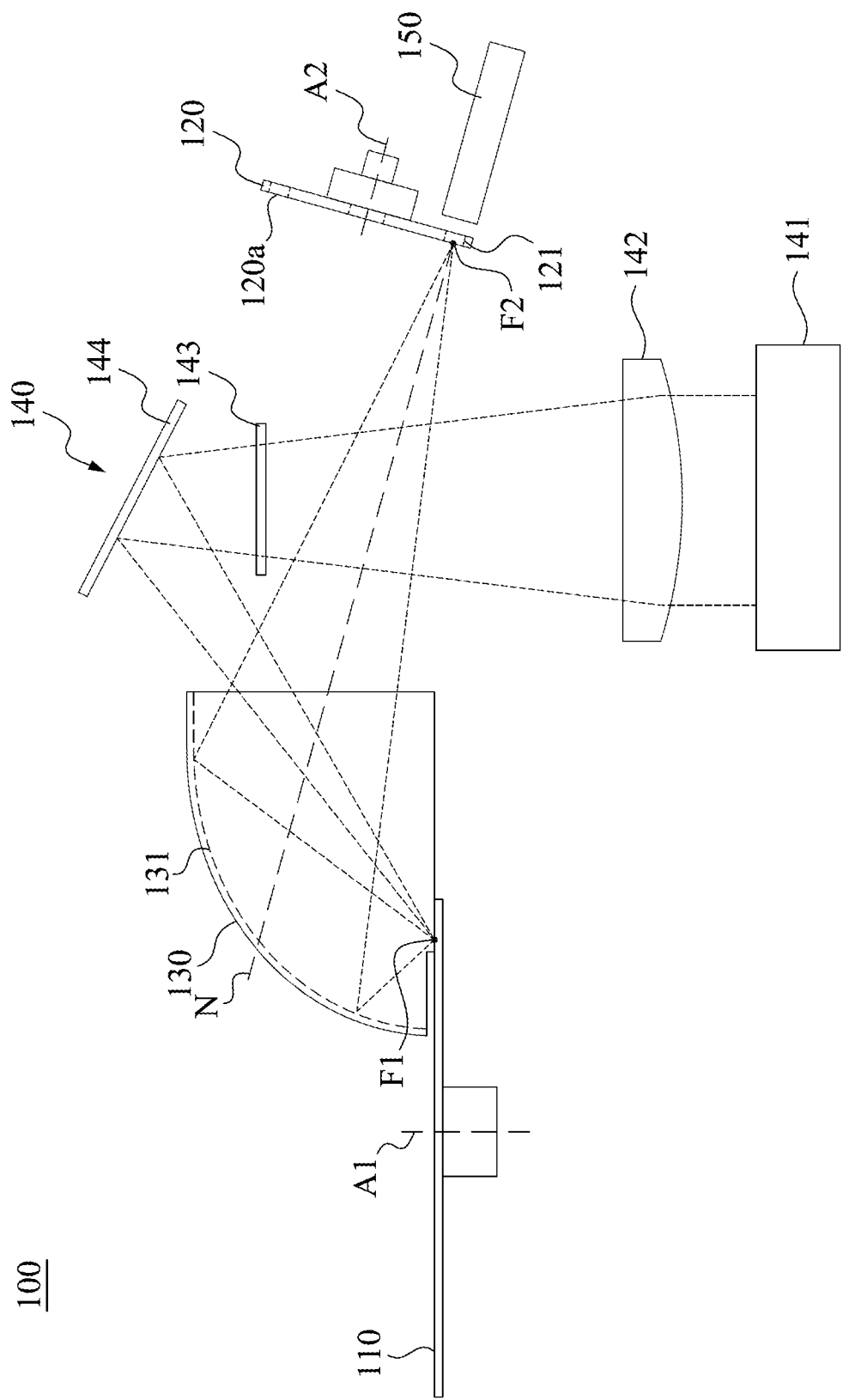
FIG. 1 is a perspective view of a light source system according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Figure 2:
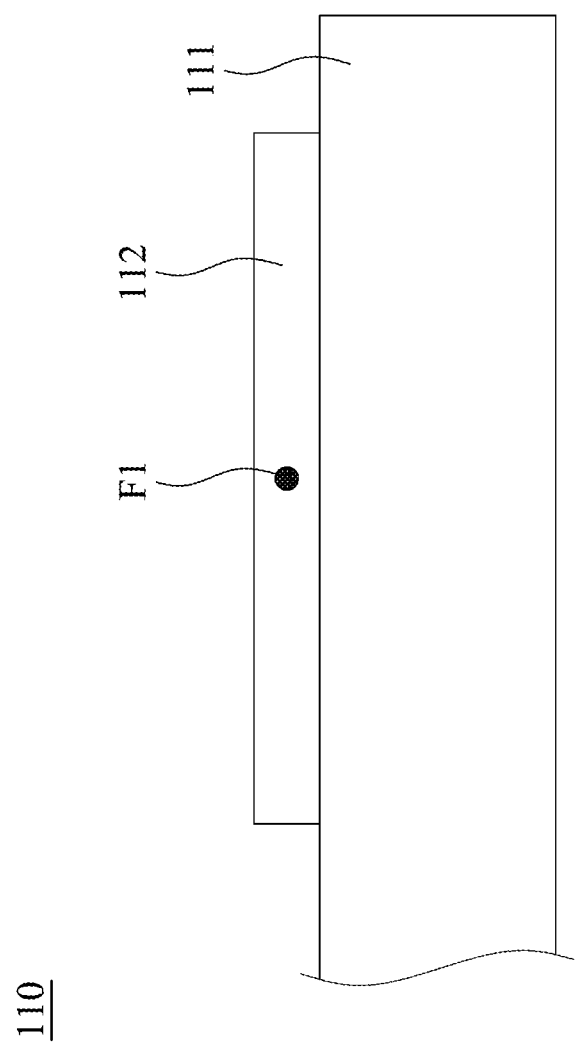
FIG. 2 is a partial side view of a fluorescent wheel according to some embodiments of the present disclosure.
Figure 3:
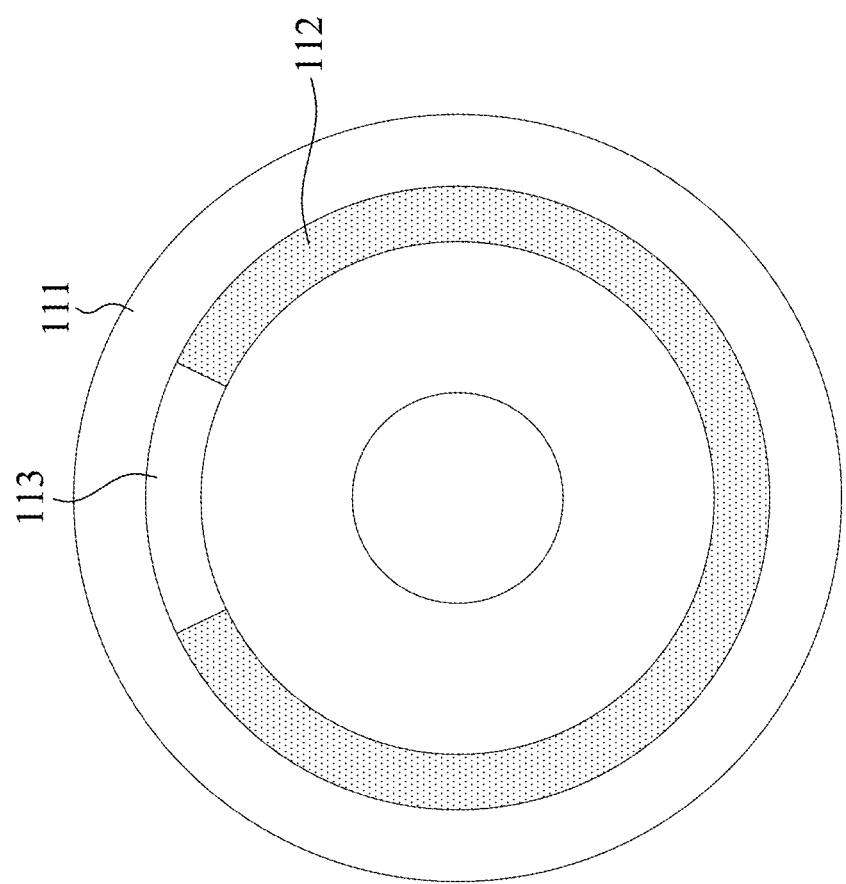
FIG. 3 is a front view of the fluorescent wheel according to some embodiments of the present disclosure.

Reference is made to FIGS. 1 to 3. FIG. 1 is a perspective view of a light source system 100 according to some embodiments of the present disclosure. FIG. 2 is a partial side view of a fluorescent wheel 110 according to some embodiments of the present disclosure. FIG. 3 is a front view of the fluorescent wheel 110 according to some embodiments of the present disclosure. As shown in FIGS. 1 to 3, the light source system 100 includes a fluorescent wheel 110, a color wheel 120, a light reflector 130, a light source module 140, and a light integrator 150. The fluorescent wheel 110 includes a substrate 111, a fluorescent section 112, and a reflective section 113, and is configured to rotate around an axis A1. The fluorescent section 112 and the reflective section 113 are arranged on the substrate 111 in a ring shape around the axis A1. The color wheel 120 includes a filter portion 121 and is configured to rotate around an axis A2. The light reflector 130 is located at a side of the substrate 111 and has a reflective curved surface 131 (indicated by a dashed line in FIG. 1). The reflective curved surface 131 has a first focal point F1 and a second focal point F2 conjugated to each other. The first focal point F1 is located on a rotation path of the fluorescent section 112. The second focal point F2 is located on a rotation path of the filter portion 121. The light source module 140 is configured to emit light to the first focal point F1. The light integrator 150 is configured to receive the light passing through the filter portion 121 of the color wheel 120 and guide the light to, for example, a projection module (not shown) for use.

Specifically, as shown in FIG. 1, the light source module 140 includes a light emitter 141, a lens 142, a diffuser 143, and a reflecting mirror 144. The light emitter 141 is configured to emit light. In some embodiments, the light emitter 141 is a blue laser light source, but the present disclosure is not limited in this regard. The lens 142 is configured to focus or transmit the light emitted by the light emitter 141. The reflecting mirror 144 is configured to reflect the light passing through the lens 142 so that the light is focused on the first focal point F1. The diffuser 143 is optically coupled between the lens 142 and the reflecting mirror 144, and is configured to even out the light, thereby solving the problem of the light speckle of the laser light source.

As shown in FIG. 1, the reflective curved surface 131 is a concave surface. In some embodiments, a contour of the reflective curved surface 131 partially matches a contour of an ellipsoid, so that the reflective curved surface 131 has two conjugate focal points (i.e., the first focal point F1 and the second focal point F2). Hence, the reflective curved surface 131 can reflect the light from the first focal point F1 to the second focal point F2, and can also reflect the light from the second focal point F2 to the first focal point F1.

In some embodiments, the light emitted by the light source module 140 is blue light. The fluorescent section 112 of the fluorescent wheel 110 is a yellow fluorescent powder section. The filter portion 121 of the color wheel 120 includes a red section, a green section, and a blue section that are arranged on the color wheel 120 in a ring shape around the axis A2. When the fluorescent wheel 110 rotates to make the first focal point F1 be located on the fluorescent section 112, most of the light emitted by the light source module 140 is converted into yellow light by the fluorescent section 112, and the yellow light is reflected by the reflective curved surface 131 to the second focal point F2 and reaches the filter portion 121 of the color wheel 120. At this time, if the rotating color wheel 120 causes the first focal point F1 to be located on the red section of the filter portion 121, red light can be filtered out and outputted to the light integrator 150; and if the rotating color wheel 120 causes the first focal point F1 to be located on the green section of the filter portion 121, green light can be filtered out and outputted to the light integrator 150. In addition, when the fluorescent wheel 110 rotates so that the first focal point F1 is located on the reflective section 113, the light emitted by the light source module 140 is sequentially reflected by the reflective section 113 and the reflective curved surface 131 to the second focal point F2 and reaches the filter portion 121 of the color wheel 120. At this time, the rotating color wheel 120 causes the first focal point F1 to be located on the blue section of the filter portion 121, and blue light can be filtered out and outputted to the light integrator 150. Hence, the light source system 100 can sequentially output three primary colors of light, such as red light, green light, and blue light, according to the time sequence for use by the projection module.

It should be noted that with the aforementioned optical configuration, a small part of the light emitted by the light source module 140 that is not converted by the fluorescent section 112 will be sequentially reflected by the surface of the fluorescent section 112 and the reflective curved surface 131 to the second focal point F2 and reach the filter portion 121 of the color wheel 120. At this time, if the rotating color wheel 120 causes the first focal point F1 to be located on the red section or the green section of the filter portion 121, the light that has not been converted by the fluorescent section 112 is sequentially reflected back to the fluorescent wheel 110 by the filter portion 121 and the reflective curved surface 131 of the color wheel 120 for conversion, thereby effectively improving the light utilization rate.

Furthermore, it can be known from the foregoing optical configuration that various colored lights (including the light emitted by the light source module 140 and the light converted by the fluorescent wheel 110) are reflected by the reflective curved surface 131 of the light reflector 130 to the color wheel 120. In other words, the various colored lights reach the color wheel 120 via the same light path. Therefore, the light path of the light source system 100 of the present disclosure is relatively simple, and the cost can be reduced without using a collimating lens and a dichroic mirror. Furthermore, the fluorescent wheel 110 of the present disclosure does not need to be sandwiched between two lenses, so the heat can be easily dissipated. It should also be noted that, in order to increase the range of light received from the fluorescent wheel 110, the width of the light reflector 130 can be increased by an appropriate amount. In this way, the position and reflection angle of the reflecting mirror 144 should be adjusted accordingly, so that the light of the light emitter 141 can enter the fluorescent wheel 110 without being blocked by the light reflector 130.

In some other embodiments, the light emitted by the light source module 140 is blue light. The fluorescent section 112 of the fluorescent wheel 110 includes a yellow fluorescent powder section and a green fluorescent powder section that are arranged on the color wheel 120 in a ring shape around the axis A2. The filter portion 121 of the color wheel 120 includes a red section, a yellow section, a green section, and a blue section When the fluorescent wheel 110 rotates to make the first focal point F1 be located on the yellow fluorescent powder section of the fluorescent section 112, most of the light emitted by the light source module 140 is converted into yellow light by the fluorescent section 112, and the yellow light is reflected by the reflective curved surface 131 to the second focal point F2 and reaches the filter portion 121 of the color wheel 120. At this time, if the rotating color wheel 120 causes the first focal point F1 to be located on the red section of the filter portion 121, red light can be filtered out and outputted to the light integrator 150; and if the rotating color wheel 120 causes the first focal point F1 to be located on the yellow section of the filter portion 121, yellow light can be filtered out and outputted to the light integrator 150. When the fluorescent wheel 110 rotates to make the first focal point F1 be located on the green fluorescent powder section of the fluorescent section 112, most of the light emitted by the light source module 140 is converted into green light by the fluorescent section 112, and the green light is reflected by the reflective curved surface 131 to the second focal point F2 and reaches the filter portion 121 of the color wheel 120. At this time, the rotating color wheel 120 causes the first focal point F1 to be located on the green section of the filter portion 121, and green light can be filtered out and outputted to the light integrator 150. When the fluorescent wheel 110 rotates so that the first focal point F1 is located on the reflective section 113, the light emitted by the light source module 140 is sequentially reflected by the reflective section 113 and the reflective curved surface 131 to the second focal point F2 and reaches the filter portion 121 of the color wheel 120. At this time, the rotating color wheel 120 causes the first focal point F1 to be located on the blue section of the filter portion 121, and blue light can be filtered out and outputted to the light integrator 150. It should be noted that, during the design, the fluorescent section 112 of the fluorescent wheel 110 may include fluorescent powder of other colors which may be matched with the filter portion 121 of the color wheel 120 to generate colors required by the projection module. In addition, in some embodiments, the blue section of the filter portion 121 of the color wheel 120 may be transparent glass or a diffuser.

As shown in FIG. 1, in some embodiments, the color wheel 120 has a light-facing surface 120a. In order to reflect the light that has not been converted back to the fluorescent wheel 110 sequentially by the filter portion 121 of the color wheel 120 and the reflective curved surface 131 for conversion, a normal line N of the light-facing surface 120a that passes through the second focal point F2 may be designed to extend through the reflective curved surface 131. Hence, the light that has not been converted by the fluorescent section 112 can be reflected back to the fluorescent section 112 for conversion in a substantially opposite direction, thereby effectively improving the light utilization rate.

In some embodiments, the substrate 111 shown in FIG. 1 is a reflective substrate, but the present disclosure is not limited in this regard.

Figure 4:
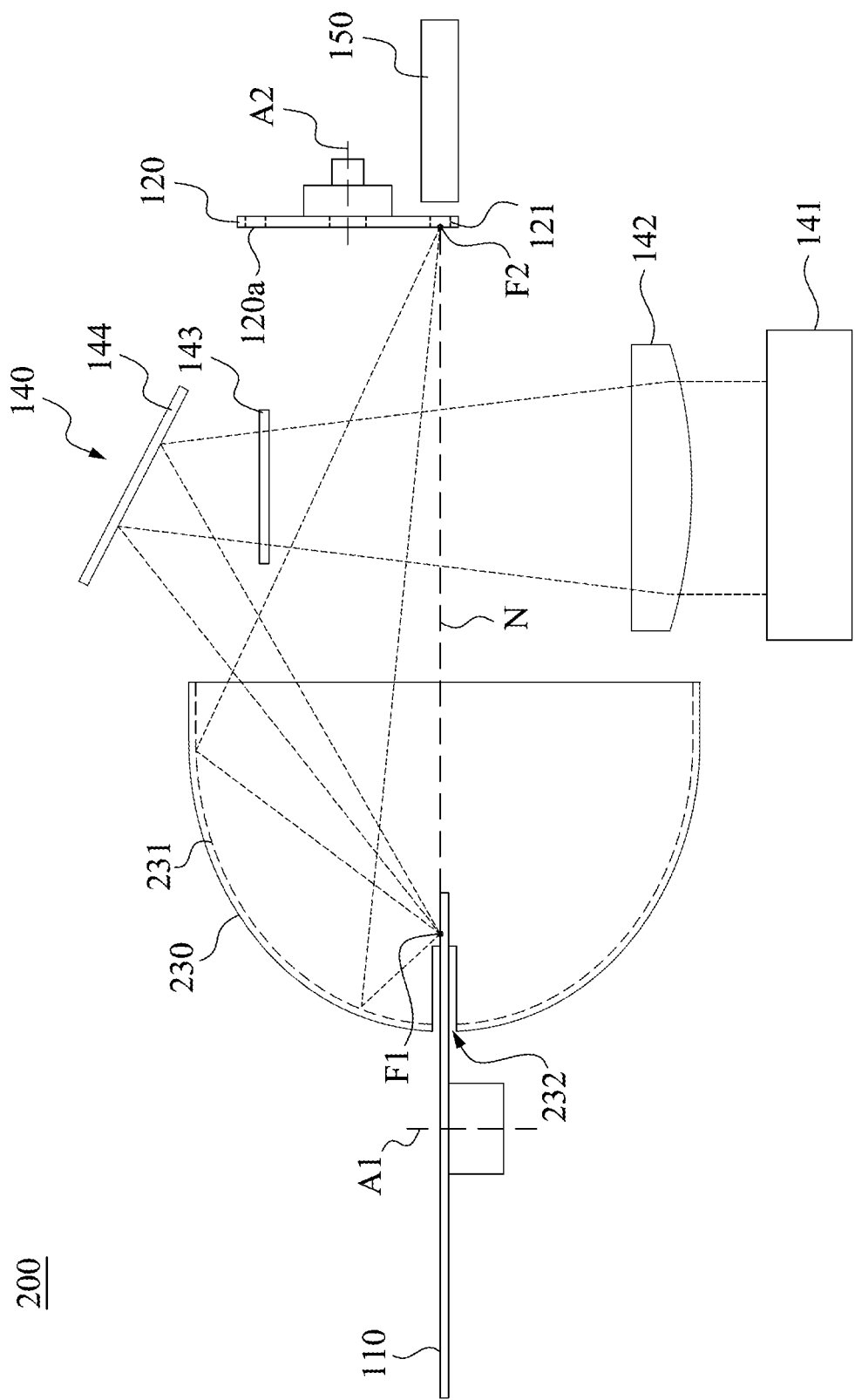
FIG. 4 is a perspective view of a light source system according to some embodiments of the present disclosure.

Reference is made to FIG. 4. FIG. 4 is a perspective view of a light source system 200 according to some embodiments of the present disclosure. As shown in FIG. 4, compared to the light source system 100 as shown in FIG. 1, the light reflector 230 of the light source system 200 of the present embodiment extends to opposite sides of the substrate 111 of the fluorescent wheel 110. Specifically, the light reflector 230 has a slit 232. The substrate 111 of the fluorescent wheel 110 partially passes through the slit 232. With the structural configuration, even if the light not converted by the fluorescent section 112 is reflected by the filter portion 121 of the color wheel 120 to the lower side of the substrate 111 in FIG. 4, the light reflector 230 extending to the lower side of the substrate 111 can still use the reflective curved surface 231 to reflect the light that has not been converted by the fluorescent section 112 back to the fluorescent wheel 110.

In some embodiments, the substrate 111 shown in FIG. 4 is a transmissive substrate, and the light that is not converted by the fluorescent section 112 can also pass through the substrate 111 from the lower side to reach the fluorescent section 112 on the upper side of the substrate 111. In some embodiments, the substrate 111 shown in FIG. 4 is a reflective substrate, and a fluorescent section 112 is correspondingly disposed on the lower side of the substrate 111 so as to be aligned with the fluorescent section 112 on the upper side of the substrate 111, such that the light that is not converted by the fluorescent section 112 can be directly converted by the fluorescent section 112 located at the lower side of the substrate 111.

In some embodiments, in order to reflect the light that has not been converted by the fluorescent section 112 back to the fluorescent wheel 110 sequentially by the filter portion 121 of the color wheel 120 and the reflective curved surface 231 shown in FIG. 4 for conversion, a normal line N of the light-facing surface 120a that passes through the second focal point F2 a may be designed to extend through the first focal point F1. Hence, the light that has not been converted by the fluorescent section 112 can be reflected back to the fluorescent wheel 110 through the lower side of the substrate 111.

Figure 5:
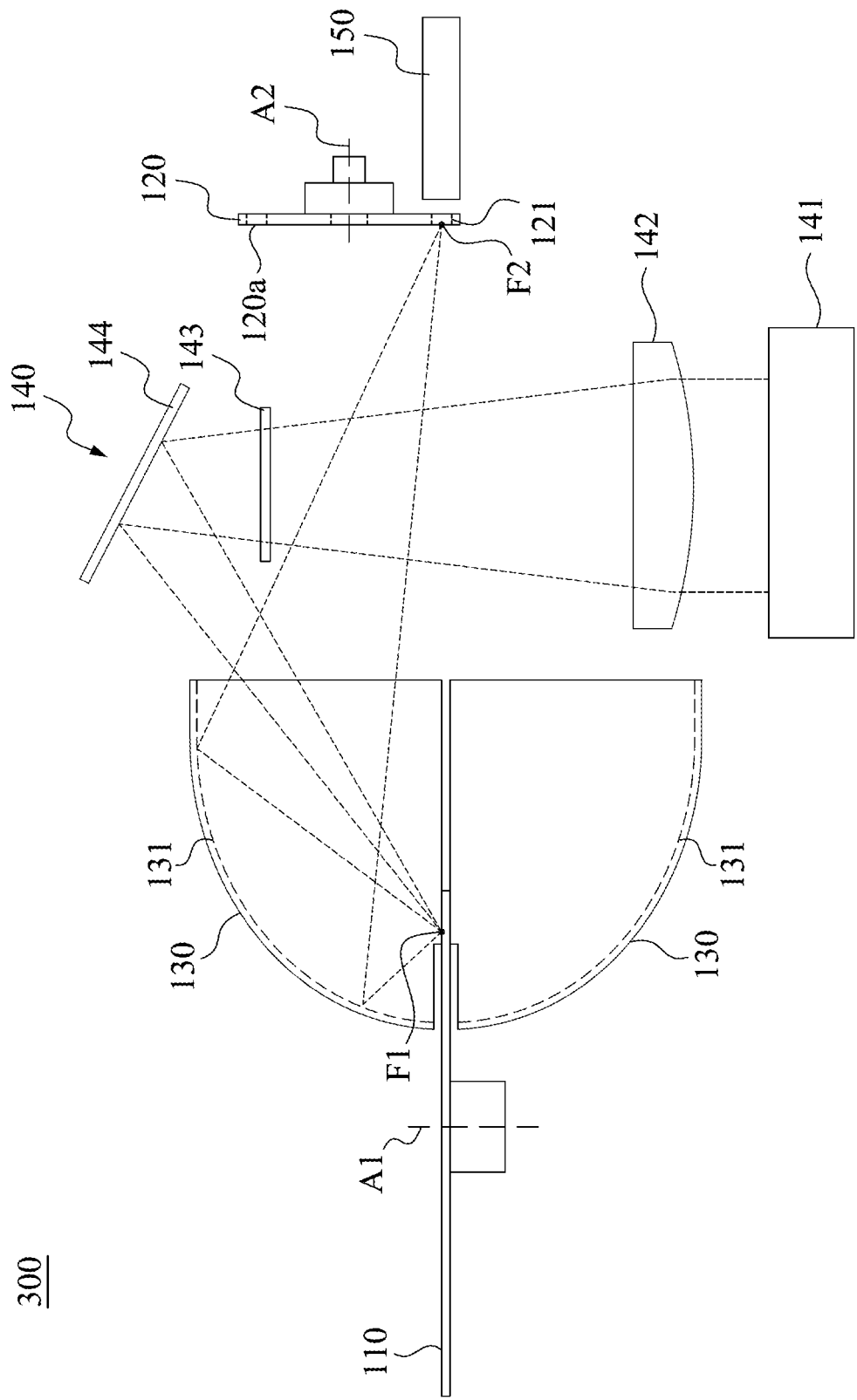
FIG. 5 is a perspective view of a light source system according to some embodiments of the present disclosure.

Reference is made to FIG. 5. FIG. 5 is a perspective view of a light source system 300 according to some embodiments of the present disclosure. As shown in FIG. 5, compared to the light source system 200 as shown in FIG. 4, the light source system 200 of the present embodiment includes two light reflectors 130. The two light reflectors 130 are respectively located at opposite sides of the substrate 111, and the second focal points F2 of the two light reflectors 130 coincide. With the structural configuration, even if the light not converted by the fluorescent section 112 is reflected by the filter portion 121 of the color wheel 120 to the lower side of the substrate 111 in FIG. 5, the light reflector 130 located at the lower side of the substrate 111 can still use the reflective curved surface 131 to reflect the light that is not converted by the fluorescent section 112 back to the fluorescent wheel 110.

In some embodiments, the first focal points F1 of the two light reflectors 130 can also coincide, such that a combination of the two light reflectors 130 in the present embodiment are substantially equivalent to the light reflector 230 shown in FIG. 4.

Figure 6:
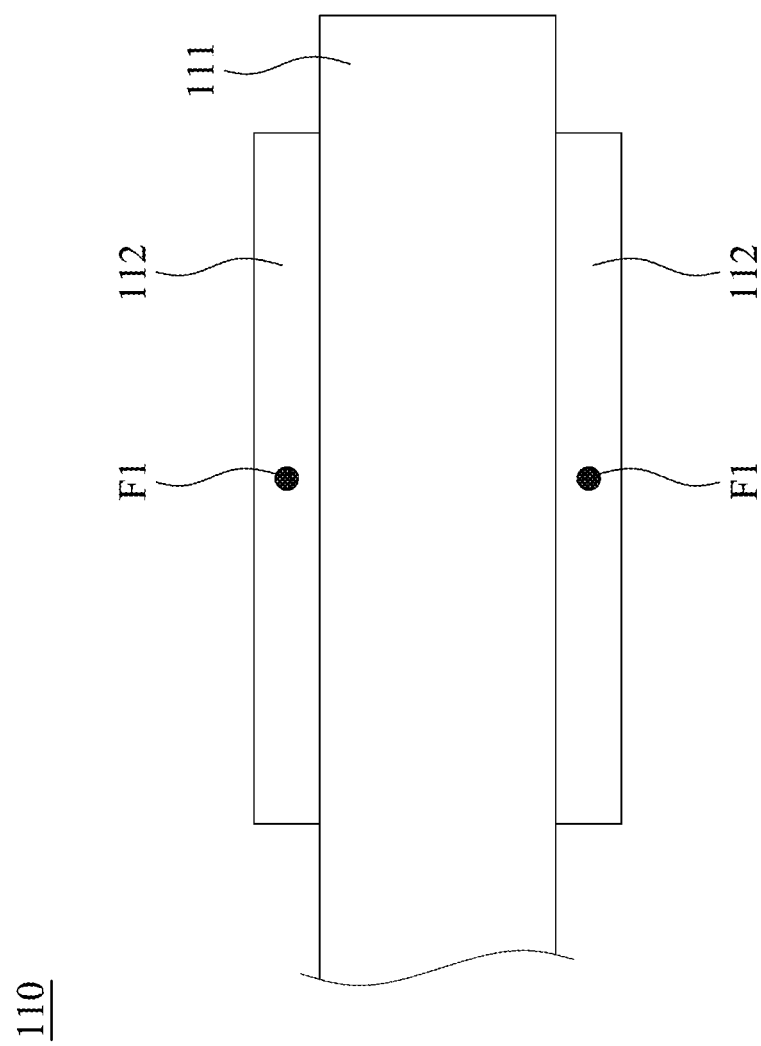
FIG. 6 is a partial side view of a fluorescent wheel according to some embodiments of the present disclosure.

Reference is made to FIG. 6. FIG. 6 is a partial side view of the fluorescent wheel 110 according to some embodiments of the present disclosure. As shown in FIG. 6 with reference to FIG. 5, a fluorescent section 112 is correspondingly arranged on the lower side of the substrate 111 so as to be aligned with the fluorescent section 112 on the upper side of the substrate 111, and the first focal points F1 of the two light reflectors 130 are located on the rotation path of the upper and lower fluorescent sections 112 respectively, such that the light that is not converted by the fluorescent section 112 can also be directly converted by the fluorescent section 112 located at the lower side of the substrate 111.

In some embodiments, the substrate 111 shown in FIG. 5 is one of a reflective substrate and a transmissive substrate.

According to the foregoing recitations of the embodiments of the disclosure, it can be seen that in the light source system of the present disclosure, various colored lights (including the light emitted by the light source module and the light converted by the fluorescent wheel) are reflected by the reflective curved surface of the light reflector to the color wheel. In other words, the various colored lights reach the color wheel via the same light path. Therefore, the light path of the light source system of the present disclosure is relatively simple, and the cost can be reduced without using a collimating lens and a dichroic mirror. Furthermore, the fluorescent wheel of the present disclosure does not need to be sandwiched between two lenses, so the heat can be easily dissipated. In addition, the reflective curved surface of the light reflector of the present disclosure has a first focal point and a second focal point respectively located on the fluorescent wheel and the color wheel, and the reflective curved surface is configured to reflect light from one of the first focal point and the second focal point to the other of the first focal point and the second focal point. Therefore, even if a part of the light focused by the light source module on the first focal point is not converted by the fluorescent wheel, this part of the light will be reflected by the reflective curved surface to the color wheel, and then be reflected back to the fluorescent wheel sequentially by the color wheel and the reflective curved surface. As a result, the light usage can be effectively improved.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A light source system, comprising:
a fluorescent wheel comprising at least one fluorescent section;
a color wheel comprising a filter portion;
at least one light reflector having a reflective curved surface which has a first focal point and a second focal point conjugated to each other, wherein the first focal point is located on a rotation path of the at least one fluorescent section, and the second focal point is located on a rotation path of the filter portion; and
a light source module configured to emit light to the first focal point.

2. The light source system of claim 1, wherein the reflective curved surface is a concave surface.

3. The light source system of claim 1, wherein a contour of the reflective curved surface partially matches a contour of an ellipsoid.

4. The light source system of claim 1, wherein the color wheel has a light-facing surface, and the light-facing surface has a normal line extending through the second focal point and the reflective curved surface.

5. The light source system of claim 1, wherein the fluorescent wheel further comprises a substrate, and the at least one fluorescent section is disposed on the substrate.

6. The light source system of claim 5, wherein the at least one light reflector is located at a side of the substrate.

7. The light source system of claim 5, wherein the at least one light reflector extends to opposite sides of the substrate.

8. The light source system of claim 7, wherein the at least one light reflector has a slit, and the fluorescent wheel partially passes through the slit.

9. The light source system of claim 7, wherein the color wheel has a light-facing surface, and the light-facing surface has a normal line extending through the first focal point and the second focal point.

10. The light source system of claim 5, wherein a number of the at least one light reflector is two, the two light reflectors are respectively located at opposite sides of the substrate, and the second focal points of the two light reflectors coincide.

11. The light source system of claim 5, wherein the substrate is a reflective substrate.

12. The light source system of claim 5, wherein the substrate is a transmissive substrate.

13. The light source system of claim 5, wherein the fluorescent wheel further comprises a reflective section disposed on the substrate, and the at least one fluorescent section and the reflective section are arranged in a ring shape.

* * * * *